INVENTORS.
FRITZ LEHRER
MAXIMILIAN CASUTT
BY
Kurt Kelman
AGENT

Oct. 3, 1967  F. LEHRER ETAL  3,344,807
SHUT-OFF VALVE
Filed Aug. 27, 1965  2 Sheets-Sheet 2
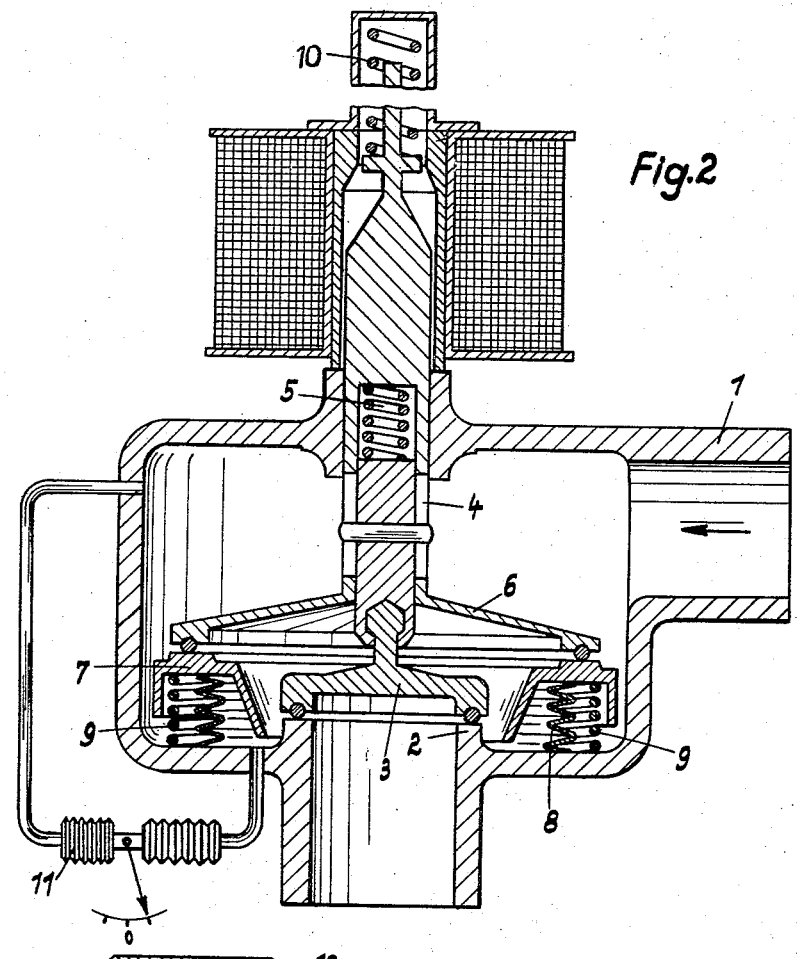
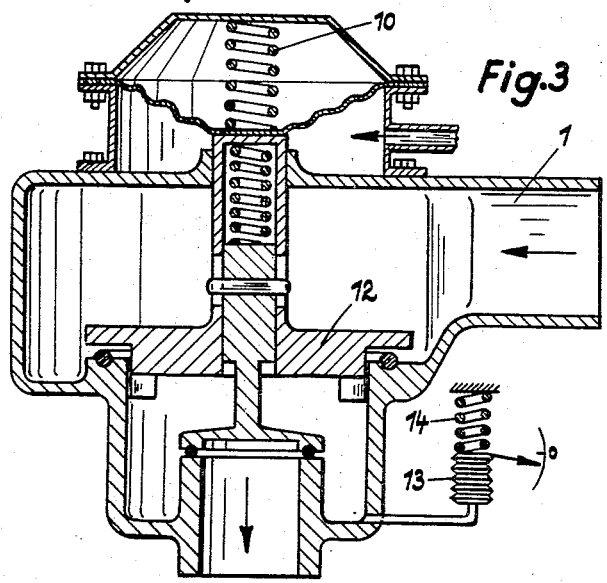
INVENTORS.
FRITZ LEHRER
MAXIMILIAN CASUTT
Kurt Kelman
AGENT

United States Patent Office 3,344,807
Patented Oct. 3, 1967

3,344,807
SHUT-OFF VALVE
Fritz Lehrer, Doblergasse 1, Vienna 7, and Maximilian
Casutt, Paniglgasse 20, Vienna 4, Austria
Filed Aug. 27, 1965, Ser. No. 483,253
10 Claims. (Cl. 137—557)

Remotely controlled valves and generally valves for uses where only small closing forces are available for operating the valves have the disadvantage that they do not ensure a reliable seal when the seat is contaminated even to the slightest extent, and that it is very difficult to check the tightness of the valve without removing the same. In valves in automatic furnaces, this disadvantage may be a source of danger.

The present invention provides a shut-off valve for liquids and gases, which valve permits of a check of its tightness after each closing operation, or automatically checks its tightness and signals the result of this check with the aid of an accessory, which will be described hereinafter.

The invention resides basically in the use of two serially arranged valve seats rather than of a single valve seat so that a chamber is formed between the two valve seats and the internal pressure in this chamber corresponds approximately to the input pressure after the closing of the valve. This chamber will be referred to as a blocking chamber hereinafter. If the volume of this chamber is reduced after the closing operation, the internal pressure will be increased in dependence on the decrease of the chamber volume to a value which can be arbitrarily determined. Depending on the degree of tightness of this blocking chamber, the artificially produced overpressure is gradually relieved. The time during which a certain pressure drop is effected is a measure of the tightness of the valve.

Shut-off valves are known which include two coaxial valve members, which are arranged one behind the other in the fluid flow path and coact with coaxial seats of the housing and in the closing position cooperate with a portion of the valve housing to define a chamber which is closed in both directions. Such valves have not been used, however, for tightness checks and have not been designed for this purpose. In a valve of this type according to the invention, the valve members are movable relative to each other in the axial direction so as to vary the initial volume of the chamber when the valve members have reached the closing position.

A great advantage of this arrangement resides in that a leak will be indicated even when only one of the two valve seats leaks and the overall arrangement still performs its service to shut-off a conduit when at least one seat is tight.

Two embodiments are shown by way of example on the diagrammatic sectional drawings.

FIG. 1 shows a first embodiment of the valve in an open condition and FIG. 2 shows this valve in a closed condition.

FIG. 3 shows a second embodiment wherein the valve is almost closed.

Figure 1:
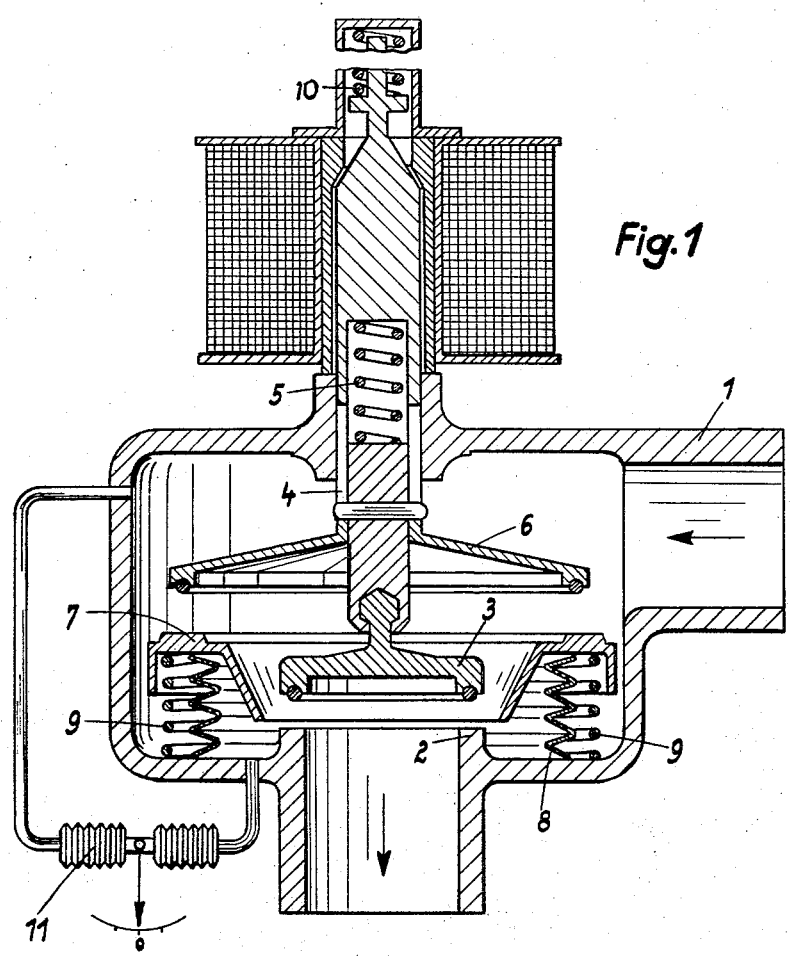

In FIGS. 1 and 2, a valve housing 1 of known type is shown, as well as a valve seat 2 for the output conduit, and a valve disc 3 associated with said seat. The stem of the valve disc is mounted in a guide sleeve 4 and held by a spring 5 in its lower limiting position. The guide sleeve 4 carries a valve cup 6, which engages the movable valve seat 7 during the closing operation. The valve seat 7 is secured to a bellows 8 so that the seat 7 is axially movable during the closing operation. This movable valve seat may be backed by a spring assembly 9 to increase the closing pressure as desired. When the closing force is applied to the guide sleeve 4—this is effected in the present embodiments by a spring 10—the disc 3 is first sealed against the seat 2 under the action of the spring force of part 5. The cup 6 continues to move until it contacts the seat 7. In this condition, the input pressure prevails in the blocking chamber which has now been formed. If the cup 6 and seat 7 continue to move, the volume of the blocking chamber will be reduced and the pressure in said chamber will be increased. When the closing operation has been terminated, the pressure in the blocking chamber is higher than in the input conduit. A pressure indicator 11, e.g., a differential pressure gauge, connected between the blocking chamber and the valve chamber will now indicate an overpressure. If both seats are tight, the overpressure will be maintained until the valve is opened. If there is a leak even at one seat only, the overpressure will be relieved within a time which is functionally related to the degree of tightness. This time can be used for a check or for an automatic indication.

Such valves are mainly usable for compressible fluids, i.e., for gases. The embodiment shown in FIG. 3 is preferably for non-compressible fluids, i.e., for liquids. In this case, the pressure is increased because a displacing member 12 forces the liquid trapped in the blocking chamber into an accordion 13, which is spring-biased and expands to take up the displaced volume. The expansion of the accordion is a measure of the overpressure. If the valve has a leak, the spring 14 will urge the accordion to its initial position so that the accordion is shortened. This change in length may be used for an indication.

Figure 4:
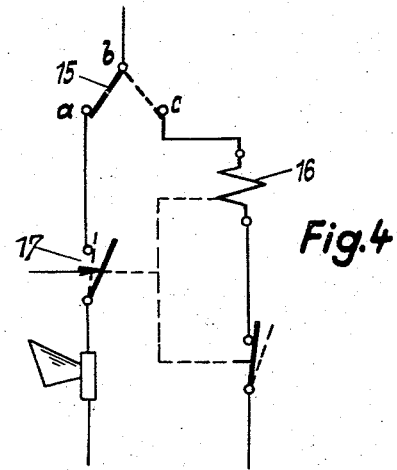
FIG. 4 illustrates an electric indicating system.

There are hardly any valves which are absolutely tight in practice. Depending on the use of an installation and the degree of danger, a certain leakage is permitted in a valve which is still considered practically tight. This means that a relief of the overpressure is permissible within a certain time. If the overpressure in the blocking chamber is allowed to act in known manner, e.g., on an electric contact 15, and the release time of this contact is limited with the aid of a time-limit relay 16, known means may be used to operate an alarm when the relief of pressure is faster than has been set at the time-limit relay. This check is repeated after each operation of the valve. A basic circuit is shown in FIG. 4. The switch position indicated in solid lines is obtained when the valve is open, the position indicated in dotted lines when the valve is closed.

(a) If the valve leaks, contact bc is changed to ba when 17 is still closed because the differential pressure has been reduced to zero. The alarm signal is generated.

(b) If the valve is tight, 17 is opened by the time limit relay before bc has been changed to ba. No alarm signal is generated.

What is claimed is:

1. A shut-off valve, which comprises a housing defining a fluid flow path, two seats in said housing, said seats defining with said housing a blocking chamber which forms part of said fluid flow path, and two valve members in said housing, each of said valve members being movable to and from engagement with one of said seats and being adapted to seal said blocking chamber in both directions when both said valve members are in engagement with the respective seats, said valve members being axially movable relative to each other while in engagement with their respective seats so as to vary the volume of said blocking chamber.

2. A shut-off valve as set forth in claim 1, in which said valve members are coaxial.

3. A shut-off valve as set forth in claim 1, in which said housing comprises a spring bellows forming a peripheral wall of said blocking chamber.

4. A shut-off valve as set forth in claim 1, which comprises a differential pressure gauge connected to said chamber and to said flow path on the supply side of said chamber.

5. A shut-off valve as set forth in claim 1, which comprises a switch, which communicates with said blocking chamber and said flow path on the input side of said blocking chamber, said switch being arranged to be operated to a first position when the pressure in said blocking chamber exceeds the pressure in said flow path, said switch being arranged to be restored to a second position when said pressures are balanced, said valve further comprising a time-limit relay arranged to be energized when said switch is in said first position and to cause said contact to be moved to an ON position in response to said energization, and from said ON position a predetermined time after the deenergization of said relay, and an alarm signal generator arranged to be energized when, and only when, said switch is in said second position and said contact is in said ON position.

6. A shut-off valve as set forth in claim 5, in which said relay is a slow-release relay and said contact is a normally open contact in series with said generator.

7. A shut-off valve as set forth in claim 1, in which one of said seats is axially movable relative to the other.

8. A valve assembly which comprises means defining a fluid flow path, two shut-off valves, each of which is disposed in said fluid flow path and operable to close the same, said valves being spaced apart, means for increasing the pressure in said fluid flow path between said valves beyond the pressure in said fluid flow path on the input side of said valves, and means for comparing a pre-set time with the time required for balancing said pressures as a result of any leaks.

9. A valve assembly as set forth in claim 8, in which one of said valves is movable toward the other in the closed condition of said valves so as to reduce the volume of said fluid flow path between said valves.

10. A valve assembly as set forth in claim 8, in which each of said valves comprises a valve member and a seat and said valve members are movable to their seats to close said valves in the direction in which said one valve is movable toward the other.

References Cited
UNITED STATES PATENTS

| | | | |
|---|---|---|---|
| 2,111,228 | 3/1938 | Studley | 137—557 X |
| 2,430,122 | 11/1947 | Grace | 137—551 |
| 2,500,156 | 3/1950 | Dechant | 137—614.19 X |
| 2,788,802 | 4/1957 | Vinson | 137—614.19 X |
| 2,814,447 | 11/1957 | Greenamyer | 137—614.19 X |
| 2,821,206 | 1/1958 | Holmes | 137—614.19 X |

M. CARY NELSON, *Primary Examiner.*

H. KLINKSIEK, *Assistant Examiner.*